June 3, 1930.  A. DE SPUCHES  1,761,818

HYDRAULIC WHEEL ACTING EITHER AS MOTOR OR AS PROPELLER

Filed Oct. 15, 1928

INVENTOR
Antonino De Spuches
by
Attorney

Patented June 3, 1930

1,761,818

UNITED STATES PATENT OFFICE

ANTONINO DE SPUCHES PRINCIPE DI GALATI, OF PALERMO, ITALY

HYDRAULIC WHEELS ACTING EITHER AS MOTORS OR AS PROPELLERS

Application filed October 15, 1928, Serial No. 312,601, and in Italy October 20, 1927.

The present invention refers to a hydraulic wheel acting either as a motor or as a propeller in regions entirely occupied by water, so that it can be sunk at any depth, either with the object of utilizing deep currents, or in order to permit of working safely protected from superficial agitation, for instance from the wave-motion of seas which are often swept by heavy winds.

The device, according to the invention, consists essentially in a paddle wheel coupled directly or through a convenient transmission to a dynamo. The wheel is partly surrounded by a protecting casing but projects therefrom so that the lower portion of said wheel is actuated by said currents. The interior of the casing is full of air, in order to prevent the water from rising in the casing itself and causing various losses of energy through friction, vertical movements, etc. The upper part of the casing is provided with an opening and a tube through which is introduced, by means of an appropriate device, compressed air at a convenient pressure. All the other parts of the arrangement are of course hermetically closed and provided with clamps.

The device according to the invention is shown by way of example, in a form of execution in the accompanying drawing, wherein.

Figure 1:
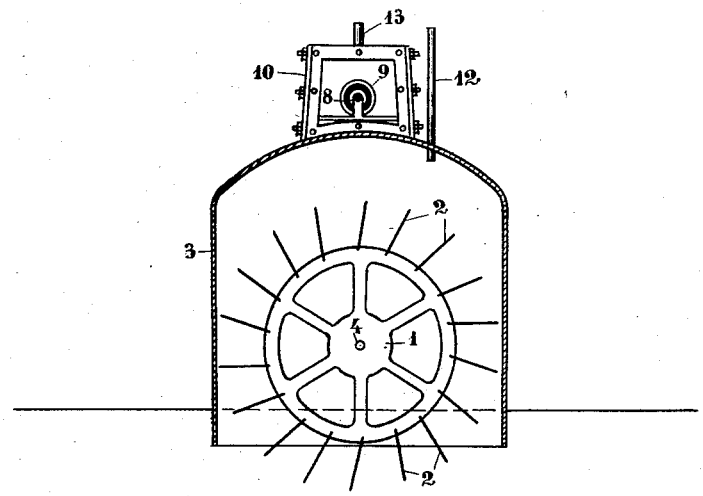
Fig. 1 is a side-view of the wheel.
Figure 2:
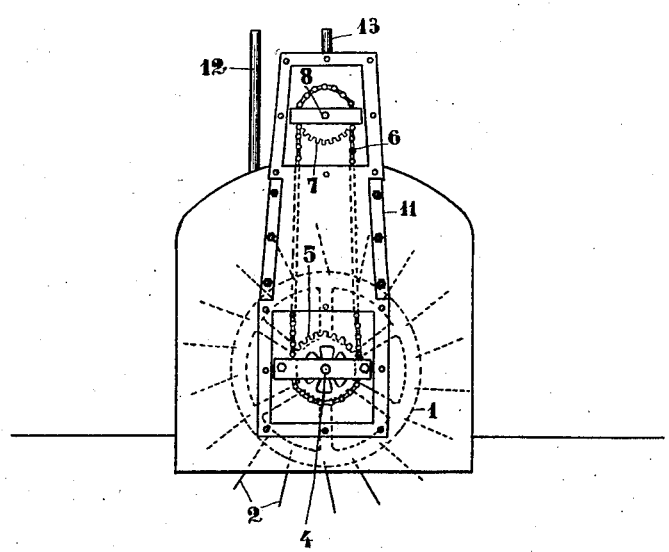
Fig. 2 is another view in elevation of the transmission side.

In the drawings, the hydraulic wheel 1 carries paddles 2 so that only those distributed over about one fifth of the circumference of the wheel, project out from main casing 3 which surrounds the wheel itself. This rather considerable extension of said main casing round the wheel has the object of rendering it more improbable that the water contained between the paddles will be carried into the casing itself.

Wheel 1 is mounted on the axle 4, which rests on bearings carried by the walls of main casing 3. One side of said axle 4 extends outwards carrying thereon a chain wheel 5. The chain 6 engages wheel 5 and drives another wheel 7, connected with the shaft 8 of the rotor of a dynamo 9.

As seen from the drawing, the electrical dynamo 9 is placed over main casing 3 in an auxiliary casing 10 rigidly connected with the first; axle 8 of the dynamo 9 is parallel with the axle 4 of the wheel and projects out from said auxiliary casing 10 as much as is necessary to receive the chain wheel 7, which is in the same plane as chain wheel 5.

Likewise, the transmission formed by elements 5, 6 and 7 is enclosed in a transmission sheath 11 which protects it from contact with the water.

Auxiliary casing 10 and sheath 11 consist in partitions which may be disconnected to facilitate the work of overhauling or repairing. The parts forming the said partitions or walls have been omitted in the drawing in order to render visible the internal arrangement.

The tube 12 for compressed air is connected to casing 3, emerges from the surface of the water, and communicates with a pump or tank for supplying air at the pressure corresponding to the depth of immersion of the device.

The conductors of the generator reach the place of utilization through a cable 13 issuing from auxiliary casing 10.

The hydraulic wheel as above described, if applied with its casing to the hull of a ship, for instance, can also act as a propelling device, coupling the wheel for this purpose with a motor, either steam explosion or electric motor to impart to it the necessary movement. It is understood that in this case the shape of the paddles should be changed appropriately according to the already known rules.

It is evident that the above-described device could be employed to utilize the energy of the flowing water of rivers, of marine straits etc., and that it could undergo several modifications still remaining within the scope of the present invention.

What I claim is:

1. A submerged hydraulic hermetically sealed power plant comprising a main casing provided with an open bottom, an auxiliary casing, a hydraulic wheel rotatably mounted in said main casing and having paddles projecting through said open bottom, an axle mounted in said auxiliary casing, transmission means connecting said hydraulic wheel and said axle, a transmission means sheath covering said transmission means and connecting the interiors of said casing and a compressed air tube leading into said main casing.

2. A submerged hydraulic hermetically sealed power plant comprising a main casing provided with an open bottom, an auxiliary casing mounted above said main casing, a hydraulic wheel rotatably mounted in said main casing and having paddles projecting through said open bottom, an axle mounted in said auxiliary casing, a chain wheel rotating with said hydraulic wheel, a second chain wheel rotating with said axle, a chain engaging both of said chain wheels, a sheath covering said chain and chain wheels and connecting the interiors of the casing and a compressed air tube leading into said main casing.

In testimony whereof I have affixed my signature this 26th day of September, 1928.

ANTONINO DE SPUCHES PRINCIPE di GALATI.